(12) United States Patent
Yeager et al.

(10) Patent No.: US 7,574,361 B2
(45) Date of Patent: Aug. 11, 2009

(54) RADIO AUDIO INDICATOR

(75) Inventors: David M. Yeager, Boca Raton, FL (US); Peter B. Gilmore, Plantation, FL (US); Deborah A. Gruenhagen, Southwest Ranches, FL (US); Charles E. Kline, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 785 days.

(21) Appl. No.: 11/241,350

(22) Filed: Sep. 30, 2005

(65) Prior Publication Data

US 2007/0075921 A1 Apr. 5, 2007

(51) Int. Cl.
*G10L 13/08* (2006.01)
(52) U.S. Cl. .................. 704/260; 704/276; 704/272
(58) Field of Classification Search ............... 704/272, 704/260, 276; 455/41.2, 557, 412; 315/123; 602/9
See application file for complete search history.

(56) References Cited

U.S. PATENT DOCUMENTS

| | | | |
|---|---|---|---|
| 5,146,620 A | 9/1992 | Swikle et al. | |
| 5,347,123 A | 9/1994 | Jackson et al. | |
| 5,771,004 A | 6/1998 | Suppelsa et al. | |
| 6,733,468 B2* | 5/2004 | Talish | 602/9 |
| 7,106,048 B1 | 9/2006 | Feight et al. | |
| 7,177,595 B2* | 2/2007 | Hamada et al. | 455/41.2 |
| 7,209,768 B2* | 4/2007 | Yonekura et al. | 455/557 |
| 7,211,958 B2* | 5/2007 | Maurer et al. | 315/123 |
| 7,251,606 B2* | 7/2007 | Horinaka et al. | 704/272 |

OTHER PUBLICATIONS

PCT International Search Report Application No. PCT/US06/34353 Dated Oct. 17, 2007—8 Pages.

* cited by examiner

*Primary Examiner*—Huyen X. Vo
(74) *Attorney, Agent, or Firm*—Barbara R. Doutre

(57) ABSTRACT

A user interface for a communication device includes a light emitting diode (LED) (200) providing both a transmit-carrier indicator and transmit-audio feedback to the user. By varying the intensity (202, 204, 206) and/or color spectrum (302, 304, 306) of the LED (200). relative to changes in transmitted audio, the user is provided with transmit-audio feedback. If LED (200) is a bi-color LED, then receive-audio feedback can also be indicated to the user by varying the second color's intensity and/or spectrum.

19 Claims, 4 Drawing Sheets

BI-COLOR LED

RECEIVE

TRANSMIT

RADIO AUDIO INDICATOR

FIELD OF THE INVENTION

The present invention relates in general to user interfaces for radio communication devices and more particularly to audio indicators for such devices.

BACKGROUND OF THE INVENTION

User interface options and ergonomics are important aspects of communication device design, such as two-way radio design. The ability of a radio user to rely on a handset becomes increasingly important in mission critical environments were visual and audio feedback may be impaired due to environmental factors.

It would be beneficial for a radio user to know that his or her handset is properly transmitting an audio signal. Currently, communication devices provide no such indication, and as such, the talker/user has no way of knowing that a speech message is being transmitted properly. Poor speech transmission may be caused by a variety of factors including a blocked microphone port, malfunctioning microphone transducer or improperly tuned circuit. While not all of these factors can be directly addressed by the user, just knowing that the speech transmission is not operating optimally would allow the user to attempt to correct the problem or seek alternative means of communication and submit the handset for repair.

Accordingly, there is a need for an improved user interface for a communication device.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figure 1:
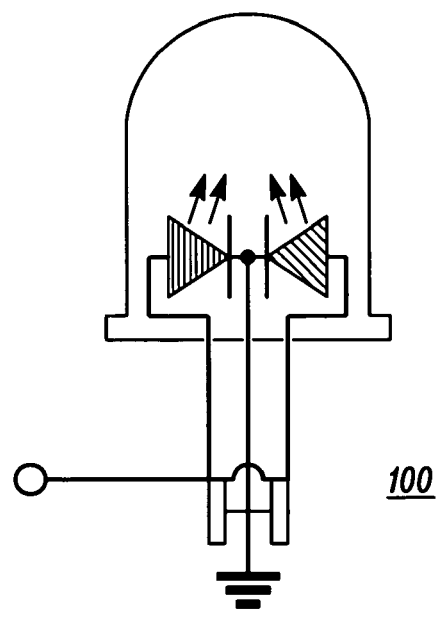
FIG. 1 shows a bi-color light emitting diode operating in accordance with the prior art.
Figure 1:
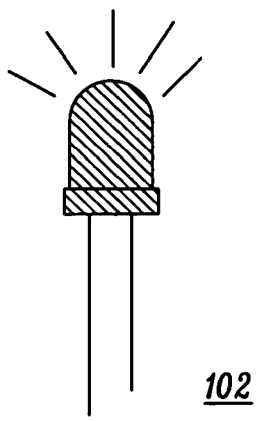
Figure 1:
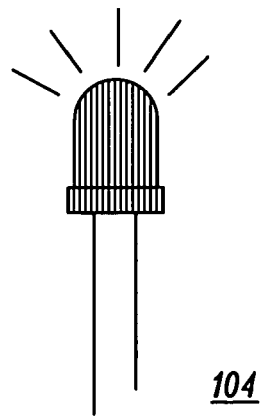

Most two-way radios utilize a continuous LED indicator that glows when a carrier signal is being transmitted. The LED is typically red (non-flashing) and merely indicates an attempt to transmit audio information. FIG. 1 shows a bi-color light emitting diode (LED) 100 known in the art being used to indicate that a radio is in a receive mode (green) 102 or a transmit mode (red) 104 of operation. However, the LED is limited to indicating these two modes with the transmit indicator associated only with the RF transmit function. As mentioned previously, when a speech signal is not present, either due to a blocked microphone port or malfunctioning microphone transducer or circuit, the talker/user has no way of knowing that the speech message is not being transmitted properly. Likewise, a blocked or malfunctioning speaker port may inhibit or prevent a listener/user from hearing an incoming voice signal.

Briefly in accordance with the present invention, there is provided herein a user interface for a communication device that provides an indication of proper transmit-audio to a user through the transmit-carrier LED. When the LED is a multi-color LED, indications of both proper transmit-audio and receive-audio can be provided to the user. The audio indicator is provided by varying the LED's color spectrum and/or intensity.

Figure 2:
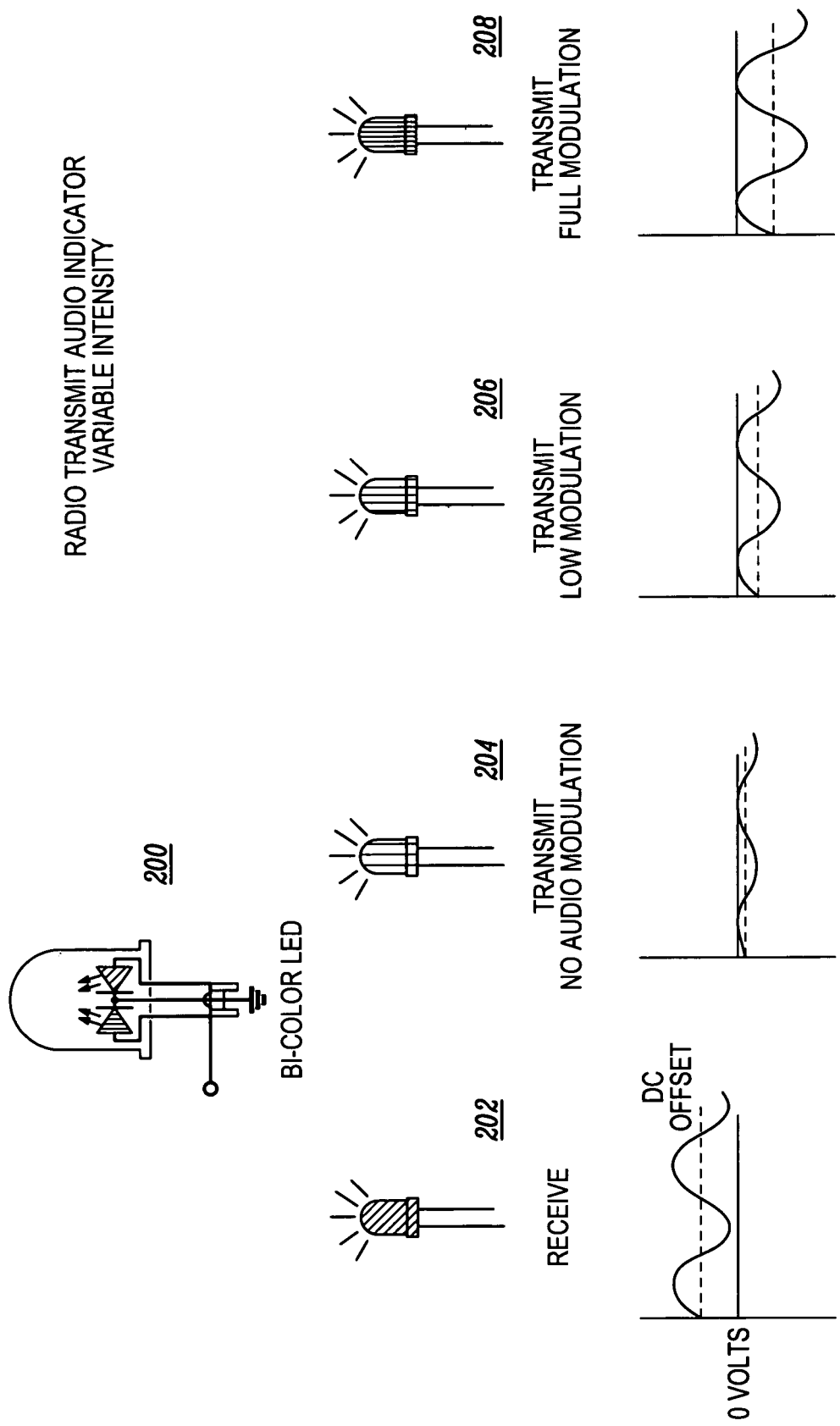
FIG. 2 shows a bi-color light emitting diode operating in accordance with a first embodiment of the invention.

The accompanying figures use line segments to denote variable intensity and hatch patterns to denote a variation in color/spectrum. FIG. 2 is a bi-color light emitting diode (LED) operating in accordance with the present invention. In accordance with the present invention, LED 200 varies in intensity relative to the audio modulation level 204, 206, 208 being transmitted through a communication device. In accordance with the invention embodiment, LED 200 provides transmit-audio feedback to the user talking into the device in addition to being an indicator of transmit-carrier. One way of using the transmit LED as an audio indicator is to vary the brightness such that a relatively dim LED 204 is used to indicate RF transmission without audio or very low audio, and a bright LED 208 indicates full or loud audio transmission. The bi-color LED 200 can operate as usual in receive mode, with a solid non-varying color 202, such as green. Alternatively, the brightness of LED 200 can be varied in the receive mode as well to assist the listener/user in knowing when audio is being received properly. If the speaker grill/port is broken or clogged with debris the listener/user will know that a message is being received and can attempt to clear the grill or replace the device. Providing variable brightness in conjunction with audio levels in transmit and receive provides the advantage of a consistent user interface for both modes of operation.

Figure 3:
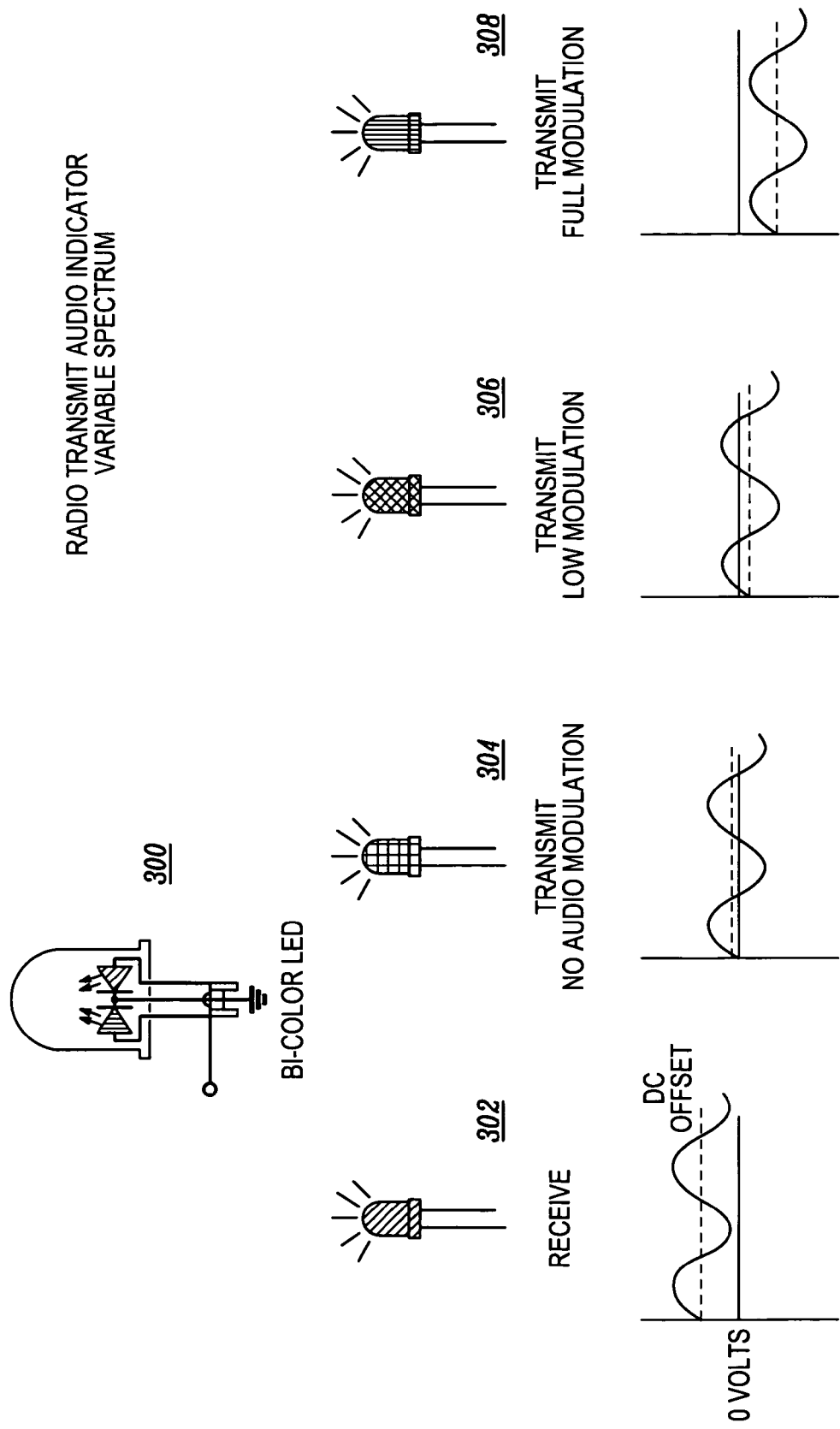
FIG. 3 shows a bi-color light emitting diode operating in accordance with a second embodiment of the invention.

FIG. 3 is another embodiment of the invention in which the color of the LED 300 is varied in spectrum 304, 306, 308. For example LED 300 can vary from high intensity orange with a silent carrier to red for full modulation 308. The displayed color of bi-color LEDs is determined by polarity of the DC voltage, which can be the output of a microprocessor or some simple audio circuit tied to the outgoing speech signal in a communication device.

Both brightness and spectrum can be varied on a bi-color LED. Therefore, the embodiments described thus far can be combined such that brightness and spectrum are used as an indication of audio level to the talker/user and listener/user. The LED 300 of the present invention varies in spectrum and or brightness during transmit mode in response to the transmitted speech signal. The LED 300 of the present invention can also vary in spectrum and or brightness during receive mode in response to a received speech signal.

The user interface of the present invention applies to both digital and analog radios. The state of the LED can be determined either from a voice activity detector line in a vocoder (digital mode) or from the amount of modulation in an RF circuit (analog mode).

The distinction between an LED simply indicating RF transmission with no speech (silent carrier) and an LED that indicates that audio is actually being transmitted (along with RF) is especially beneficial in the public safety environment, where the likelihood of microphone ports being blocked due to water, mud or other environmental factors is higher. A radio user having knowledge the transmit-audio is not getting through properly, gives the user the opportunity to attempt to clear or clean the microphone port area or seek an alternative means of communication. Similarly, a radio user having knowledge that the receive-audio is not functioning properly, gives the user the opportunity to attempt to clear or clean the speaker port area or seek an alternative means of communication.

Figure 4:
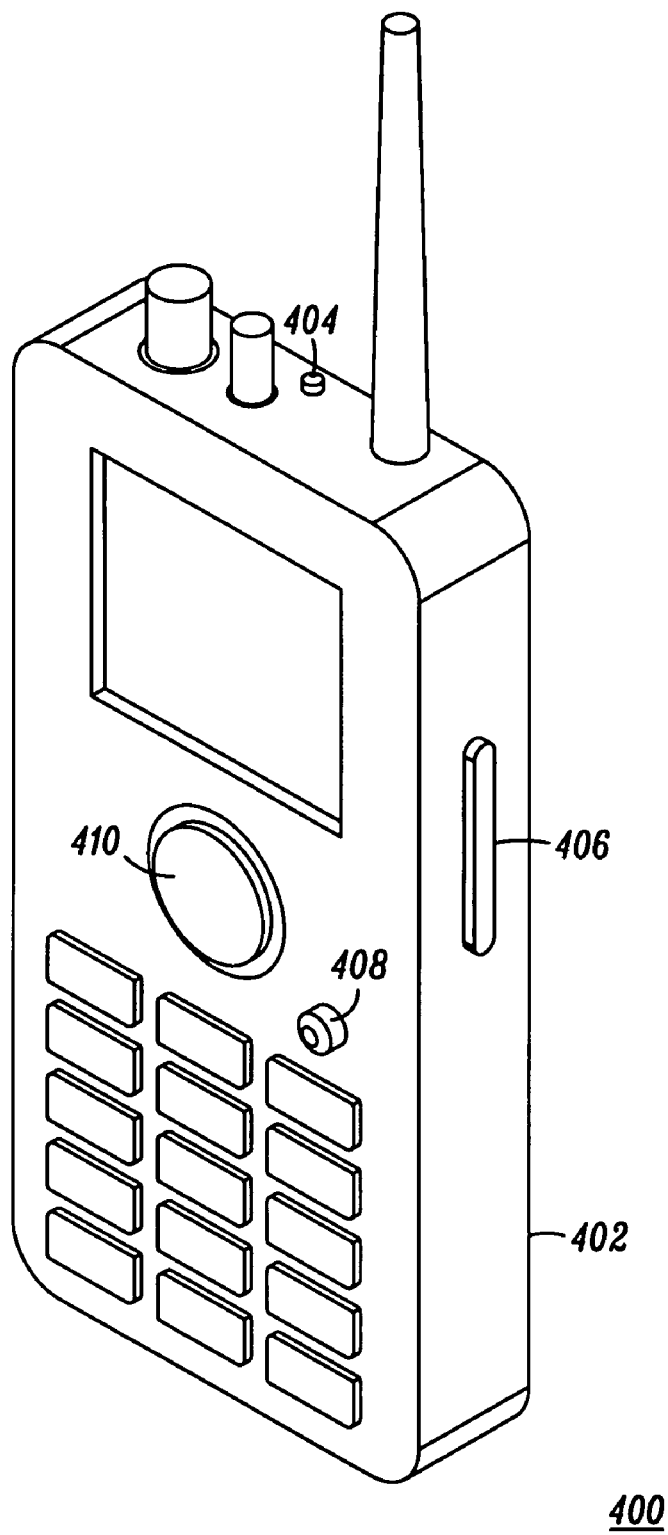
FIG. 4 is a radio formed in accordance with the present invention.

FIG. 4 is a two-way radio incorporating the user interface in accordance with the present invention. Radio 400 includes a housing 402 and a light emitting diode (LED) 404 coupled thereto. In accordance with the present invention, LED 404 indicates a malfunction in transmit-audio to a user of the radio. The malfunction in transmit-audio is indicated to the user upon keying up the radio at PTT 406 and speaking into a microphone port 408 of radio 400. Blocked microphone porting or other problems impacting the audio will be indicated to the user by a variation in either color and/or intensity of the LED 404. Again, the LED 404 preferably provides an indication of both transmit-audio feedback and transmit-carrier to the user. A malfunction in receive-audio can also be indicated to the user when LED 404 is a multi-color LED. A first color can be used to indicate the transmit-audio while a second color is used to indicate the receive-audio. By varying the intensity and/or color spectrum of the second color of LED 404 during receive mode, a blocked speaker grill 410 can be detected and cleared or the device replaced by the user.

The audio feedback indicator can be obtained in either digital or analog radio operating environments. For example, the transmit-audio feedback can be obtained by voice activity detected in a vocoder in a digital mode of operation. The transmit-audio can be obtained in response to modulation in the radio's RF circuitry in an analog mode of operation. Again, the audio feedback is indicated to the user by varying the intensity level of the LED and/or by varying color spectrum of the LED. While the LED being used for transmit-audio feedback is preferably the transmit-carrier LED, a separate LED could be used as well. The use of a multi-color LED allows both transmit and receive paths to be monitored by the user.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A user interface for a communication device, comprising a light emitting diode (LED) providing both a transmit-carrier indicator and transmit-audio feedback in form of first variations in the LED in response to a user speaking into the communication device during transmit mode, and the LED providing receive-audio feedback in form of second variations in the LED during receive mode, the first variations and the second variations in the LED providing an indication of audio component malfunction to the user during the transmit mode and the receive mode respectively of the communication device.

2. The user interface of claim 1, wherein the LED varies in intensity relative to changes in transmitted audio modulation level.

3. The user interface of claim 1, wherein the LED varies in color spectrum relative to changes in transmitted audio modulation level.

4. The user interface of claim 1, wherein the LED varies in intensity and color spectrum relative to changes in transmitted audio modulation level.

5. A user interface for a communication device, comprising:
a light emitting diode (LED) coupled to the communication device, the LED providing a transmit carrier indicator, and first variations in the LED providing an indication of transmit-audio path component malfunction in response to the user speaking into the communication device, and second variations in the LED providing an indication of receive-audio path component malfunction in response to audio generated from the communication device.

6. The user interface of claim 5, wherein the LED varies in intensity relative to the communication device's transmitted audio modulation level.

7. The user interface of claim 5, wherein the LED varies in color spectrum relative to the communication device's audio modulation level.

8. The user interface of claim 5, wherein the LED is a bi-color LED.

9. The user interface of claim 8, wherein the bi-color LED provides the transmit audio path malfunction indication by varying a first color in intensity and spectrum, and the bi-color LED provides the receive-audio path malfunction indication by varying a second color in intensity and spectrum.

10. A radio, comprising:
a housing; and
a light emitting diode (LED) coupled to the housing, the LED indicating transmit carrier, and first variations in the LED indicating malfunctions in a transmit-audio path component during transmit mode and second variations in the LED indicating malfunctions in a receive-audio path component during receive mode to a user of the radio.

11. The radio of claim 10, wherein the transmit-audio feedback is indicated to the user by varying an intensity level of the LED.

12. The radio of claim 10, wherein transmit-audio feedback is indicated to the user by varying a color spectrum of the LED.

13. The radio of claim 10, wherein the malfunction in transmit-audio is indicated to the user upon keying up and speaking into the radio.

14. The radio of claim 10, wherein the transmit-audio feedback is responsive to the radio's modulation.

15. The radio of claim 10, wherein the LED is a multi-color LED.

16. The radio of claim 15, wherein the multi-color LED utilizes a first color to indicate transmit carrier and varies the first color in at least one of intensity and spectrum to indicate transmit-audio.

17. The radio of claim 16, wherein the multi-color LED utilizes a second color to indicate the receive mode varies the second color in at least one of intensity and spectrum to indicate receive-audio.

18. The radio of claim 17, wherein the variation in the first color indicates a malfunction with a microphone port of the radio.

19. The radio of claim 18, wherein the variation in the second color indicates a malfunction with a speaker port of the radio.

* * * * *